June 17, 1952     D. J. GERRITSEN     2,600,867
METHOD OF SEPARATING SHELLS AND MEAT OF SHELLFISH
Filed Feb. 15, 1946
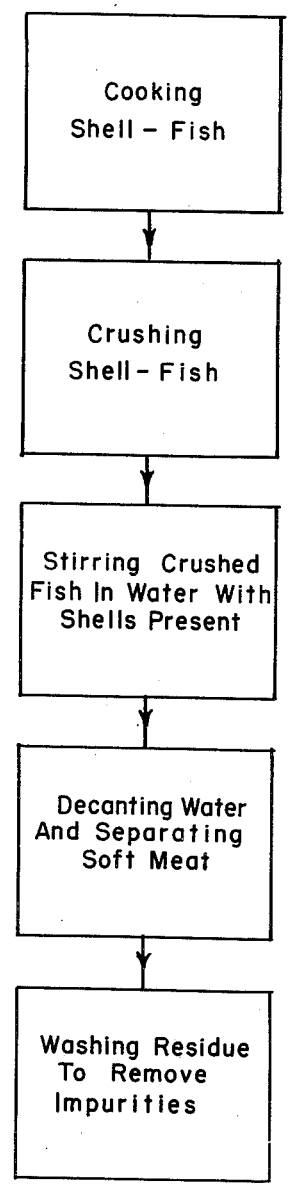
INVENTOR
Dirk Jan Gerritsen
By Wenderoth, Lind & Ponack
Attorneys

UNITED STATES PATENT OFFICE 2,600,867

METHOD OF SEPARATING SHELLS AND MEAT OF SHELLFISH

Dirk Jan Gerritsen, Eindhoven, Netherlands, assignor, by mesne assignments, to Hartford National Bank and Trust Company, Hartford, Conn., as trustee Application February 15, 1946, Serial No. 648,027
In the Netherlands June 12, 1943

Section 1, Public Law 690, August 8, 1946
Patent expires June 12, 1963

7 Claims. (Cl. 241—14)

The invention relates to a method of separating shells and meat of shell-fish, more particularly of snails such as slipper limpets (Crepidula fornicata), in a liquid by the disparity in the rapidity of settlement of the shells and the mass of meat.

According to the invention, the separation is preceded by disintegration of the shell-fish, viz., by such a disintegration that substantially only the soft parts of the meat are disintegrated. Prior to the separation the meat should preferably be cooked.

The invention will be explained hereinafter more fully with reference to the separation of the meat of slipper limpets; it must be observed, however, that the invention is not restricted to this species of shell-fish.

Slippers occur in large banks on the sea-coasts of some countries and their meat constitutes a source of protein which, up to the present, has hardly been utilized for the human consumption or for other purposes.

The meat body of the slipper essentially consists of two parts, a substantially disc-shaped part (the sucker) of a fairly hard and tough meaty substance which constitutes, with respect to dry matter, approximately 70% of all the meat of the slipper and a smaller part which forms approximately 30% of the total mass of meat and which contains the digestive organs of the animal.

According to the invention, by crushing the slippers prior to the separation of meat and shells and by treating them in such manner that practically only the soft parts of the meat are disintegrated, it is possible, by making use of the disparity in rapidity of settlement and/or in dimensions of this finely divided soft meat with respect to the tougher undisintegrated parts, to separate the latter from the soft meat.

This separation offers the advantage, that the greater proportion of the meat body of the slipper, which contains approximately 70% of the total amount of nitrogen, is obtained free from the digestive organs and the like, which generally give rise to an unpleasant earthy or salty taste. Moreover, it is thus easily possible to remove mud or sand which are present especially in the soft part of the slipper.

In order to insure that in carrying out the invention that there is the least possible disintegration of the tough parts of the meat, the cooked shell-fish must be disintegrated in a careful manner. This disintegration may be effected by crushing the shell-fish between crushing rolls or cracking walls. Use may also be made of a hammer-mill, a cross-mill or a similar device. In this case the number of revolutions of the mill is so chosen that the linear speed of the rotating parts by which the shell-fish are smashed, is preferably less than 50 m./sec. and is located, for example, between 10 and 20 m./sec. It is thus assured that the tough part of the meat remains intact and, moreover, that the shells break into coarse pieces only, whilst only a small amount of shell grit is produced. The holes in the sieve through which the smashed shell-fish are forced to pass, must be so large that the undisintegrated tough parts of meat (suckers) of the slipper can pass through them. For slippers it is preferable to take dimensions of approximately 1.5 cms.

In order to ensure a sufficiently fine disintegration of the soft parts of the body, it is advisable to keep the crushed mass, either with the addition of water or of an aqueous solution or not, in motion for some time. Due to their cutting and rubbing action the shell fragments bring about the desired disintegration of the soft meat parts whereas the tough parts remain substantially intact. The disintegration of the soft parts of the meat may be brought about by stirring the whole of the mass, for example in a stirring or shaking device or in a rotating drum.

Subsequent to the disintegration of the shellfish the comparatively coarse shell particles may be caused to settle and the liquid present thereon may be decanted whereupon the undisintegrated tough meat parts present in this liquid may be separated from the remainder of the soft meat and from the major part of the impurities such as sand, mud and fine shell particles, by making use of the greater quickness of settlement and/or of the larger dimensions of the undisintegrated parts of the meat with respect to those of the finely divided soft meat and the impurities. The disintegrated mass may be separated, for example, into comparatively coarse shell particles, undisintegrated tough parts of meat and finely divided soft parts of meat with mud, etc., by having the mass carried along by a current of liquid which flows through successive containers having overflow rims of successively greater width so that in each container the current of liquid flows at a lower speed than in the preceding one and the coarse shell particles remain behind in the first container, the undisintegrated tough meat parts in the following container and the larger proportion of the soft meat and the impurities in the last container. Subsequently the undisintegrated tough parts of the meat are freed from small quantities of shell particles, of soft meat and of other impurities which are still present by sifting, for example by means of a shaking sieve or of a rotating, perforated drum.

According to one particular mode of realization, the separation of the coarse shell particles from the other constituents of the crushed mass is effected, preferably continuously, by moving the crushed mass, for example with the aid of a transport screw, against a current of liquid, whereupon the coarse meat parts carried along by the liquid are separated from the fine parts of meat, shell particles and impurities as described above.

The liquid which contains the disintegrated soft parts of the meat as well as the fine shell particles and the impurities may be freed from these products, for example by filtering or centrifuging, and, if desired, it may be utilized once more for the separation of a fresh quantity of crushed slippers. Dissolved substances of the slipper, such as meat bases and other extract substances, are accumulated in this liquid in the course of time and, if desired, they may be isolated therefrom. In the mass which remains behind after centrifuging or filtering the parts of meat may be separated from the fine shell particles and from the impurities by dissolving the meat in a slightly alkaline medium at an increased temperature.

Instead of separating the coarse shell particles by settlement from the remainder of the shellfish, as indicated above, it is also possible at first to separate the crushed and disintegrated shellfish by sifting, for example with the aid of a shaking sieve or drum, in such manner that the coarse shell particles and the undisintegrated tough parts of the meat remain behind on the sieve and then to isolate the coarse shell particles from the mass remaining behind on the sieve by making use of their greater quickness of settlement in a liquid.

*Example*

Slippers (*Crepidula fornicata*) were cooked and then crushed in a hammer-mill performing 470 revolutions per minute, wherein the distance between the outermost point of the hammers and the axis amounted approximately to 40 cms. The hammer-mill was provided with a sieve whose meshes had a diameter of 1.4 cms.

The crushed animals were mixed for about 5 minutes with the same volume of water in a rotating drum occupying an oblique position. Subsequently careful decantation took place, the major part of the disintegrated soft meat, of the fine shell fragments and of the impurities being thus removed. The remainder was washed in counter-current with water. The tough suckers carried along by the water current were freed from adhering impurities by washing them on a shaking sieve having meshes of 5 to 5 mms. The meat thus obtained had, with respect to dry matter, an ash percentage of 8.6%. For comparison it may be mentioned that the tough and soft parts of slippers which had been washed with water, cooked and shelled by hand, had an ash percentage of 13.9 and 20.5% respectively.

What I claim is:

1. A method of separating undesired soft meat portions of shell-fish from desired hard meat portions thereof, comprising the steps of crushing the shell-fish at a pressure at which only the shell and soft meat portions are disintegrated while the hard meat portions are left substantially whole, agitating the crushed shell-fish to effect further disintegration of the soft meat portions, and floating the crushed shell-fish in a liquid to separate the disintegrated soft meat portions from the whole hard meat portions by the disparity in the rapidity of settlement of the respective meat portions in the liquid.

2. A method of separating undesired soft meat portions of shell-fish from desired hard meat portions thereof, comprising the steps of coarsely crushing the shell-fish at a pressure at which only the shell and soft meat portions are disintegrated while the hard meat portions are substantially left whole, further crushing the soft meat portions of the shell-fish meat to complete the disintegration of the soft meat portions, and floating the crushed shell-fish in a liquid to separate the disintegrated soft meat portions from the whole hard meat portions by the disparity in the rapidity of settlement of the respective meat portions in the liquid.

3. A method of separating undesired soft meat portions of shell-fish from desired hard meat portions thereof, comprising the steps of coarsely crushing the shell-fish at a pressure at which only the shell and soft meat portions are disintegrated while the hard meat portions are left substantially whole, stirring the shell fragments to further disintegrate only the soft meat portions of the shell-fish meat, and floating the crushed shell-fish in a liquid to separate the disintegrated soft meat portions from the whole hard meat portions by the disparity in the rapidity of settlement of the respective meat portions in the liquid.

4. A method of separating undesired soft meat portions of shell-fish from desired hard meat portions thereof, comprising the steps of crushing the shell-fish at a pressure at which only the shell and soft meat portions are disintegrated while the hard meat portions are left substantially whole, agitating the crushed shell-fish to effect further disintegration of the soft meat portions, floating the crushed shell-fish in a liquid to separate the comparatively coarse shell particles from the meat portions, decanting the liquid containing the meat portions, and separating the whole hard meat portions from the soft meat portions by the disparity in the rapidity of settlement of the respective meat portions in the latter liquid.

5. A method of separating undesired soft meat portions of shell-fish from desired hard meat portions thereof, comprising the steps of cooking the shell-fish, crushing the cooked shell-fish at a pressure at which only the shell and soft meat portions are disintegrated while the hard meat portions are left whole, agitating the crushed shell-fish to effect further disintegration of the soft meat portions, and floating the cooked crushed shell-fish in a liquid to separate the disintegrated soft meat portions from the substantially whole hard meat by the disparity in the rapidity of settlement of the respective meat portions in the liquid.

6. A method of separating undesired soft meat portions of shell-fish from desired hard meat portions which comprises the steps of crushing the shell-fish at a pressure at which only the shell and soft meat portions are disintegrated while the hard meat portions are left substantially whole, mixing the crushed shell-fish with water, stirring the crushed shell-fish in the water to effect further disintegration of the soft meat portions while the coarser shell portions precipitate, decanting the water containing the meat portions to free the shell-fish of the coarse shell portions, and separating the whole hard meat portions from the disintegrated soft meat portions by the disparity in the rapidity of settlement of the respective meat portions in the water.

7. A method of separating undesired soft meat portions of shell-fish from desired hard meat portions thereof, which comprises the steps of crushing the shell-fish at a pressure at which only the shell and soft meat portions are disintegrated while the hard meat portions are left substantially whole, mixing the crushed shell-fish with water, stirring the crushed shell-fish in the water to effect further disintegration of the soft meat portions while precipitating coarser shell particles, decanting the water containing the meat portions to separate the coarser shell portions from the meat, separating the whole hard meat portions from the disintegrated soft meat portions by the disparity in the rapidity of settlement of the respective meat portions in the water, and separating remaining hard meat portions with coarse shell particles by dissolving the meat portions in a heated alkaline liquid.

DIRK JAN GERRITSEN.

REFERENCES CITED

The following references are of record in the file of this patent:

UNITED STATES PATENTS

| Number | Name | Date |
| --- | --- | --- |
| 1,787,835 | On | Jan. 6, 1931 |
| 2,051,676 | Bloedorn | Aug. 18, 1936 |
| 2,281,590 | Newton | May 5, 1942 |
| 2,450,398 | Sanders | Sept. 28, 1948 |

FOREIGN PATENTS

| Number | Country | Date |
| --- | --- | --- |
| 871,892 | France | Jan. 22, 1942 |
| 104,402 | Sweden | Apr. 28, 1942 |
| 549,613 | Great Britain | Nov. 30, 1942 |